Patented Aug. 14, 1934

1,970,470

UNITED STATES PATENT OFFICE 1,970,470

ROAD SURFACING COMPOSITION AND THE LIKE

Edward Arthur Murphy, Erdington, Birmingham, England, assignor to Dunlop Rubber Company, Limited, Erdington, Birmingham, England, a British corporation No Drawing. Application December 15, 1933, Serial No. 702,564. In Great Britain November 23, 1932

7 Claims. (Cl. 106—23)

This invention relates to compositions for covering surfaces of roads and the like and is particularly concerned with compositions comprising fillers such as granite chippings or sand in admixture with rubber.

The object of the invention is to produce cheap rubber compositions of the aforesaid kinds having improved resistance to disintegration.

According to the invention, the aforesaid compositions comprise fillers such as granite chippings or sand in admixture with flocculent or granular precipitates of rubber or the like produced from aqueous dispersions of the kinds hereinafter specified. Preferably, the proportion of flocculent or granular precipitates of rubber present with respect to the fillers is small.

The flocculent or granular precipitates of rubber have adhesive properties superior to those of the latex composition from which these precipitates are prepared.

Furthermore, owing to the flocculent or granular precipitates of rubber having already passed through a stage corresponding to the ordinary coagulation of latex, these compositions can be used more conveniently.

It has been found for instance that if granite chippings, sand, or other suitable rock or siliceous mineral of either natural or artificial origin and known generically as rock are mixed for example in a cement mixer with a filtered rubber precipitate in the proportion of 7 parts of precipitate and 95 parts chippings and the resulting product laid down as a surfacing material, the layer when dry resembles a tar macadam road surface especially after being cold rolled, except that it appears to have greater resilience.

It has been known for some time that instead of the usual coherent coagulum it is possible to obtain rubber as a flocculent precipitate from latex by the use of certain coagulants and by the adjustment of the concentration of the latex, see for instance, "Estate Rubber", O. de Vries, page 143, 1920.

The aforesaid flocculent or granular precipitates can be prepared from rubber latex in controllable manner by the use of various coagulating agents and methods of coagulation provided that the coagulation is effected in the presence of a relatively large quantity of water and with or without the presence of certain amounts of alkaline or colloidal substances found to have a restraining effect upon the coagulation.

The flocculent or granular precipitates can be filtered if desired, in this way removing a large proportion of the water content. The filtering means employed may be, for example, of ceramic material, cotton fabric, or fine mesh wire gauze. If desired, suction may be employed to aid the filtration.

Examples of suitable coagulants are insoluble metallic salts produced in situ, acids such as acetic acid, salts such as zinc sulphate and magnesium sulphate.

The metallic salts produced in situ as for instance magnesium silicate or calcium silicate are particularly useful in this connection.

Examples of substances having a restraining effect on the coagulation are caustic potash, casein, sodium aluminate, glue and gum acacia. The amount of such substances used also influences the degree of subdivision of the granular dispersion.

The degree of concentration has also an influence on the fineness of the precipitate. In general the lower the concentration the finer the initial precipitate.

The aqueous dispersions aforesaid are preferably employed for the purpose of precipitation of the flocculent or granular precipitates at such dilutions that 100 ccs. thereof contain not more than 10 grams of total solids.

By the suitable choice of reagents precipitates of varying consistency can be formed.

If desired, the granular precipitates can be washed free from soluble products such as soluble sulphates or chlorides by known means, as for instance by decantation or filtration and washing prior to their compacting.

The dispersions of rubber or the like comprise those consisting of rubber, gutta-percha, balata, or similar vegetable resins occurring naturally or artificially obtained. Such artificial aqueous dispersions may include those of coagulated rubber, vulcanized rubber, synthetic rubber, waste or reclaim. Inasmuch as the compounding ingredients are mixed with the dispersion before precipitation or to the finely divided precipitate no mastication of the rubber is required for this purpose and the rubber is in this sense an unmasticated rubber regardless of its source.

If desired, any of the aforementioned dispersions may be used alone or in admixture with one another.

Any of the aforesaid dispersions may contain the usual known compounding and vulcanizing ingredients and/or may be in the first instance in concentrated form.

Concentrates such as are obtained in accordance with Patent 1,846,164, February 23, 1932, or British Patent 219,635 to which may be added any one or more of the usual compounding ingredients may also be employed subsequent to dilution.

The aforesaid vulcanization and/or compounding ingredients which are added in the form of their dispersions may be added to the aforesaid aqueous emulsions or dispersions of rubber or the like prior or subsequent to the precipitation of the granular or flocculent coagula.

Compounding ingredients may also, if desired, be added in the dry state to the aforesaid granular precipitates subsequent to their formation so that the final concentration of the mixing is high.

Having now particularly described my invention, I claim—

1. Compositions for covering surfaces of roads and the like comprising a mixture of rock particles and a finely divided precipitate of unmasticated rubber composition in the proportion of about seven parts of precipitate to ninety five parts of rock.

2. A method of making a road surfacing composition, comprising precipitating rubber composition from an aqueous dispersion thereof in a finely divided precipitate and mixing and compacting said precipitate with finely divided rock in the proportion of about seven parts of rubber to ninety-five parts of rock.

3. A method of making a road surfacing composition comprising coagulating rubber material from an aqueous dispersion thereof containing less than 10% of dispersed material to a cohesive flocculent suspension while forming therein a precipitate of a silicate, admixing the flocculent material with granular material in proportion of about seven of the flocculent rubber material to 95 of rock and compacting the resultant mixture.

4. A method of making a road surfacing composition which comprises coagulating a rubber material from an aqueous dispersion thereof containing less than 10% of dispersed material to a cohesive flocculent suspension while forming a precipitate of a silicate, filtering the resulting flocculent material and admixing the filtered material with rock particles in proportions of filtered materials to rock particles of about seven to ninety-five.

5. A method of making a road surfacing composition which comprises coagulating a rubber material from an aqueous dispersion thereof containing less than 10% of dispersed material to a cohesive flocculent suspension while forming a precipitate of a silicate, filtering the resulting flocculent material and admixing the filtered material with rock particles in proportions of filtered materials to rock particles of about seven to ninety-five and cold rolling of the resulting mixture.

6. A composition for covering road surfaces and the like which comprises a mixture of rock particles with a flocculent cohesive coagulated rubber composition in the proportion of about seven of rubber composition to ninety-five of rock material.

7. A composition for covering road surfaces and the like which comprises a mixture of rock particles with a flocculent cohesive coagulated rubber composition containing a precipitated silicate, the proportions of rubber composition to finely divided siliceous material being about seven to ninety-five.

EDWARD ARTHUR MURPHY.